(12) United States Patent
Park

(10) Patent No.: US 12,706,352 B2
(45) Date of Patent: Aug. 11, 2026

(54) BATTERY PACK CONNECTOR

(71) Applicant: SAMSUNG SDI CO., LTD., Yongin-si (KR)

(72) Inventor: Seokryun Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 713 days.

(21) Appl. No.: 18/092,473

(22) Filed: Jan. 3, 2023

(65) Prior Publication Data

US 2023/0216146 A1 Jul. 6, 2023

(30) Foreign Application Priority Data

Jan. 4, 2022 (KR) ........................ 10-2022-0000931

(51) Int. Cl.
*H01M 50/502* (2021.01)
*H01M 50/231* (2021.01)

(52) U.S. Cl.
CPC ....... *H01M 50/502* (2021.01); *H01M 50/231* (2021.01)

(58) Field of Classification Search
CPC .......................... H01M 50/502; H01M 50/231
See application file for complete search history.

(56) References Cited

U.S. PATENT DOCUMENTS 4,900,264 A * 2/1990 Bennett .................. H01R 12/78 439/422
2005/0110458 A1* 5/2005 Seman, Jr. ............ H01M 50/51 320/114
2010/0066307 A1 3/2010 Kim
2011/0151285 A1 6/2011 Hong et al.
2011/0159323 A1 6/2011 Kim
2014/0099519 A1 4/2014 Hong et al.
2014/0212695 A1* 7/2014 Lane .................. H01M 50/519 429/7
2014/0285990 A1 9/2014 Kim et al.
2015/0162650 A1 6/2015 Ahn et al.
2016/0081193 A1* 3/2016 Leggett ................ H05K 7/1427 361/796
2017/0062794 A1 3/2017 Lee et al.
2019/0081310 A1* 3/2019 Capati ................. H01M 50/526
2019/0081420 A1* 3/2019 Chuo ................... H05K 1/0245
2020/0161626 A1* 5/2020 Kotik .................. H01M 50/107
(Continued)

FOREIGN PATENT DOCUMENTS

CN 107959735 A * 4/2018 ........... H05K 5/0086
EP 0734095 A1 * 9/1996 ............. H01R 9/031
JP 2018101513 A * 6/2018 ........... H01R 13/405
(Continued)

OTHER PUBLICATIONS

Machine Translation of CN-107959735-A (Jul. 6, 2025) (Year: 2025).*
(Continued)

*Primary Examiner* — Matthew J Merkling
(74) *Attorney, Agent, or Firm* — Lee IP Law, P.C.

(57) ABSTRACT

A battery pack connector may include a plurality of layers stacked on top of each other along a vertical direction, and a plurality of pad portions arranged at corresponding positions in respective ones of the plurality of layers in central portions of the respective layers.

14 Claims, 7 Drawing Sheets

(56) References Cited

U.S. PATENT DOCUMENTS

| | | | |
|---|---|---|---|
| 2021/0052222 | A1 | 2/2021 | Chahine et al. |

FOREIGN PATENT DOCUMENTS

| | | | |
|---|---|---|---|
| JP | 2021-510000 | A | 4/2021 |
| KR | 10-2010-0032821 | A | 3/2010 |
| KR | 10-2011-0070030 | A | 6/2011 |
| KR | 10-2011-0075138 | A | 7/2011 |
| KR | 10-2011-0075138 | A1 | 7/2011 |
| KR | 10-2014-0116662 | A | 10/2014 |
| KR | 10-2015-0065280 | A | 6/2015 |
| KR | 10-2018-0084462 | A | 7/2018 |

OTHER PUBLICATIONS

Machine Translation of JP-2018101513-A (Jul. 6, 2025) (Year: 2025).*

Korean Notice of Allowance issued Nov. 2, 2024, for corresponding KR Patent Application No. 10-2022-0000931.

Korean Office Action issued May 14, 2024 for corresponding KR Patent Application No. 10-2022-0000931.

European Extended Search Report dated May 22, 2023 for corresponding EP Patent Application No. 23150363.2.

* cited by examiner

BATTERY PACK CONNECTOR

CROSS-REFERENCE TO RELATED APPLICATION

This application is based on and claims priority under 35 U.S.C. § 119 to Korean Patent Application No. 10-2022-0000931, filed on Jan. 4, 2022, in the Korean Intellectual Property Office, the disclosure of which is incorporated by reference herein in its entirety.

BACKGROUND

1. Field

One or more embodiments relate to a battery pack connector.

2. Description of the Related Art

In general, secondary batteries refer to batteries that can be repeatedly charged and discharged, unlike non-rechargeable primary batteries. Secondary batteries are used as energy sources of devices, e.g., mobile devices, electric vehicles, hybrid electric vehicles, electric bicycles, and uninterruptible power supplies. Single-cell secondary batteries or a module or pack form of secondary batteries, each including a plurality of cells connected to each other as a unit, may be used according to the types of devices that employ secondary batteries.

A battery pack may include a battery protection circuit module (PCM) for protecting a secondary battery from, e.g., short circuits, disconnections, overcurrent, and overvoltage, that may occur during charging and discharging of the secondary battery. The PCM may include a flexible circuit board (FPCB) coupled to a battery module, and a connector is mounted on the FPCB.

SUMMARY

According to aspects of embodiments, a battery pack connector may include a plurality of layers stacked on top of each other along a vertical direction, and a plurality of pad portions arranged at corresponding positions in respective ones of the plurality of layers in central portions of the respective layers.

In the battery pack connector according to an embodiment, first to third pad portions may be arranged between first to fourth open portions, respectively, in respective layers of the battery pack connector.

In the battery pack connector according to an embodiment, the first to third pad portions may be arranged on each of both sides of a central terminal portion in respective layers.

In the battery pack connector according to an embodiment, the second and third pad portions may be respectively arranged on both sides on the first pad portion to be spaced apart from each other.

In the battery pack connector according to an embodiment, the second and third pad portions may be symmetrically disposed with respect to the first pad portion.

In the battery pack connector according to an embodiment, each of the plurality of pad portions may overlap at least another of the plurality of pad portions in an adjacent one of the plurality of layers along the vertical direction.

In the battery pack connector according to an embodiment, the plurality of pad portions may be arranged in pairs in the vertical direction, each of the pairs being positioned in adjacent ones of the plurality of layers, respectively, and each of the pairs vertically overlapping each other.

According to other aspects of embodiments, a battery pack may include the battery pack connector.

According to yet other aspects of embodiments, a battery pack connector may include a plurality of layers stacked on top of each other along a vertical direction, and a plurality of pad portions arranged at corresponding positions in each of the plurality of layers, each of the plurality of pad portions overlapping at least another of the plurality of pad portions in an adjacent one of the plurality of layers along the vertical direction.

BRIEF DESCRIPTION OF THE DRAWINGS

Features will become apparent to those of skill in the art by describing in detail exemplary embodiments with reference to the attached drawings, in which.

DETAILED DESCRIPTION

Figure 1:
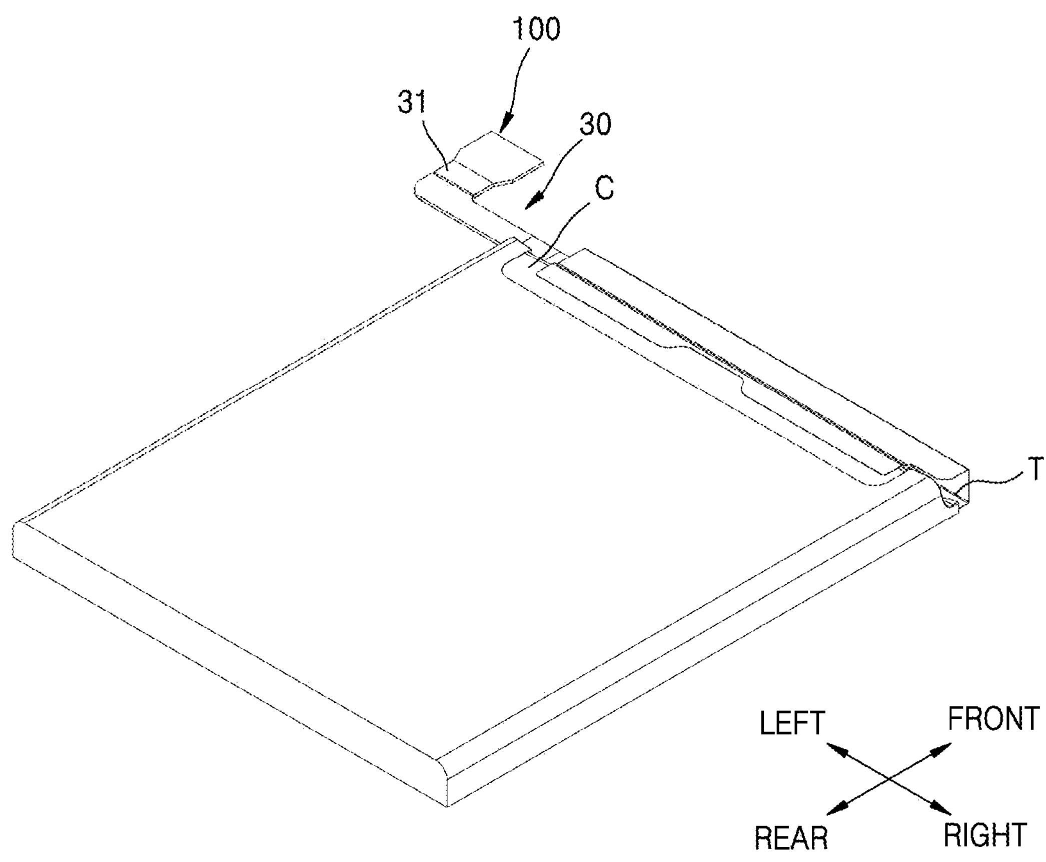
FIG. 1 illustrates a perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

In the following embodiments, while such terms as "first," "second," etc., may be used to describe various components, such components must not be limited to the above terms. Also, in the following embodiments, an expression used in the singular encompasses the expression of the plural, unless it has a clearly different meaning in the context.

In the following embodiments, it is to be understood that the terms such as "including," "having," and "comprising" are intended to indicate the existence of the features or components disclosed in the specification, and are not intended to preclude the possibility that one or more other features and components may be added.

In the following embodiments, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

Hereinafter, a battery pack connector according to an embodiment is described with reference to FIGS. 1 and 2.

FIG. 1 shows a battery pack according to an embodiment. FIG. 2 is an exploded perspective view of a battery pack according to an embodiment.

Figure 2:
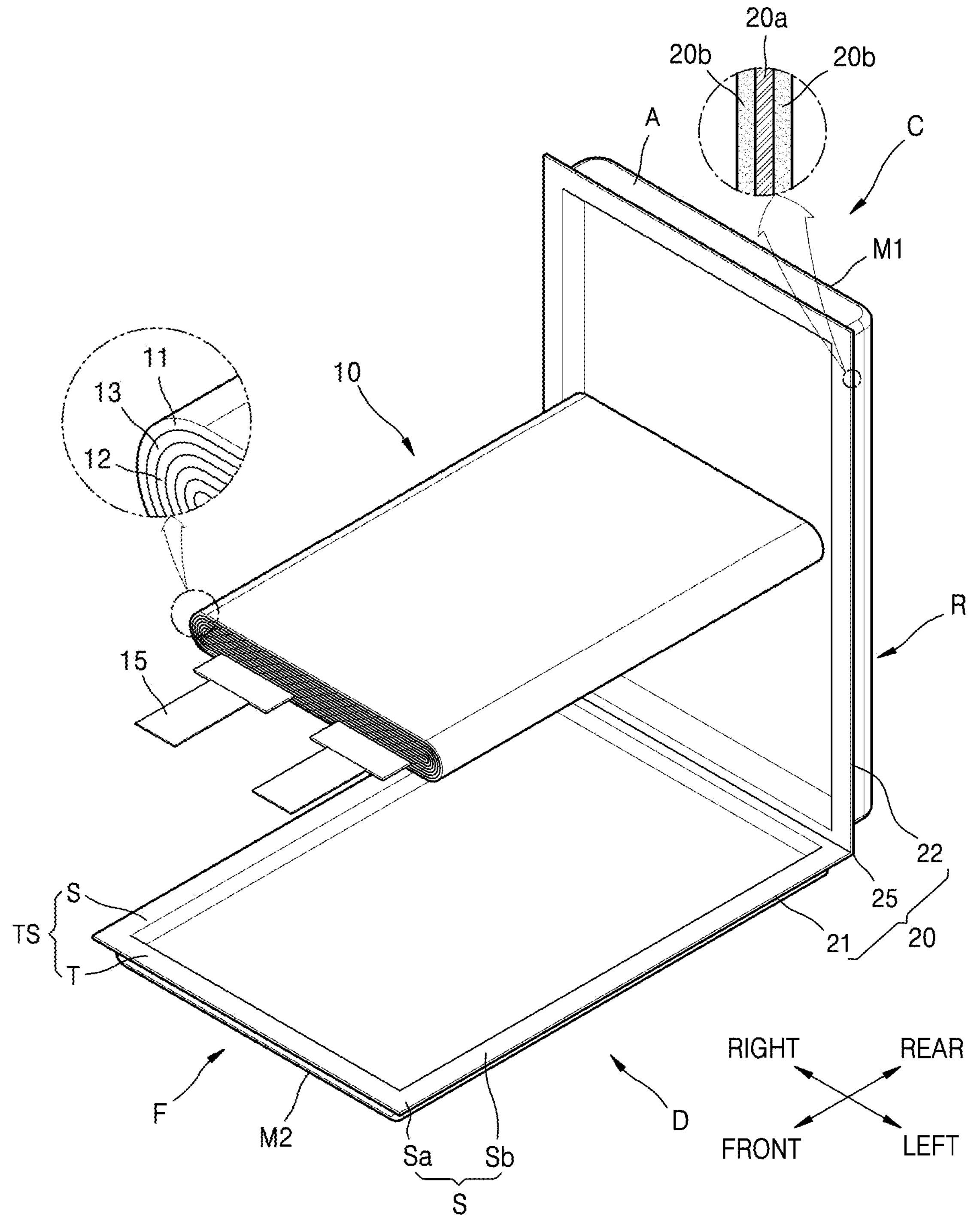
FIG. 2 illustrates an exploded perspective view of a battery pack according to an embodiment.

Referring to FIGS. 1 and 2, a battery pack according to an embodiment may include a battery cell C. The battery cell C may include an accommodating portion A, e.g., a case, that accommodates an electrode assembly 10, and a sealing portion TS that extends along an edge of the accommodating portion A to seal the accommodating portion A. The electrode assembly 10 may be formed in a roll form by winding first and second electrode plates 11 and 12, which are arranged to face each other with a separator 13 therebetween, or may be formed in a stack form by stacking a plurality of first and second electrode plates 11 and 12 with the separator 13 therebetween.

An electrode tab 15 forming a charge/discharge path may be connected to the electrode assembly 10. The electrode tab 15 may include two electrode tabs 15 respectively having different polarities and electrically connected to the electrode assembly 10, and each of the two electrode tabs 15 connected to the electrode assembly 10 in the accommodating portion A may be drawn out from the accommodating portion A, e.g., through a front surface F of the accommodating portion A.

The accommodating portion A in which the electrode assembly 10 is accommodated may be formed in a substantially rectangular parallelepiped shape. In particular, the accommodating portion A may include the front surface F from which the electrode tab 15 is drawn out, a rear surface R opposite to the front surface F, a pair of main surfaces M1 and M2 connecting the front surface F and the rear surface R and occupying a relatively large area, and a pair of side surfaces D connecting the front surface F and the rear surface R and occupying a relatively small area.

The pair of main surfaces M1 and M2 may occupy the largest area among the surfaces of the accommodating portion A, e.g., the pair of main surfaces M1 and M2 may overlap each other and the major surfaces of the electrode assembly 10. The pair of main surfaces M1 and M2 may be formed with a greater area than each of the areas of the front surface F, the rear surface R, and the pair of side surfaces D. Also, the front surface F, the rear surface R, and the pair of side surfaces D may be connected to the pair of main surfaces M1 and M2 at different corners along the pair of main surfaces M1 and M2 of the accommodating portion A.

In an embodiment, the pair of main surfaces M1 and M2 and the pair of side surfaces D may respectively be formed at positions facing each other. For example, the pair of main surfaces M1 and M2 may include first and second main surface M1 and M2, which face each other. For example, as illustrated in FIG. 2, the front surface F, the rear surface R, and the pair of side surfaces D may be perpendicular to the pair of main surfaces M1 and M2, and may define lateral side surfaces of the accommodating portion A.

The battery cell C may further include the sealing portion TS formed along the edge of the accommodating portion A to seal the accommodating portion A. The accommodating portion A accommodating the electrode assembly 10 and the sealing portion TS sealing the accommodating portion A may be formed from an exterior material 20 continuously, e.g., integrally, formed to surround the electrode assembly 10. That is, the exterior material 20 may form the accommodating portion A that accommodates the electrode assembly 10 while surrounding the electrode assembly 10, and an excess portion of the exterior material 20, which remains after forming the accommodating portion A, may, e.g., extend continuously in an outward direction and in parallel to the pair of main surfaces M1 and M2 to, form the sealing portion TS that seals the accommodating portion A.

The exterior material 20 may include a flexible exterior material, e.g., a pouch. For example, the exterior material 20 may include a metal layer 20*a*, e.g., a thin aluminum plate, and an insulating layer 20*b* formed on opposite, e.g., both, surfaces of the metal layer 20*a*, e.g., a resin coating layer. At this time, the metal layer 20*a* may be exposed to the outside through a cross section where the exterior material 20 is horizontally cut. As will be described below, the metal layer 20*a* may be exposed through an edge of the sealing portion TS in which first and second exterior materials 21 and 22 are coupled to each other to face each other with the electrode assembly 10 therebetween.

In an embodiment, the exterior material 20 may include the first and second exterior materials 21 and 22, e.g., first and second exterior cases, which are coupled to each other to face each other with the electrode assembly 10 therebetween. In a state in which the electrode assembly 10 is between the first and second exterior materials 21 and 22, after folding the first and second exterior materials 21 and 22 through a folding portion 25 connecting the first and second exterior materials 21 and 22 to each other, such that the first and second exterior materials 21 and 22 overlap each other, the contacting portions of the first and second exterior materials 21 and 22 are mutually coupled to each other along edge areas of the first and second exterior materials 21 and 22 by thermal fusion or the like. For example, the first and second exterior materials 21 and 22 may be folded, e.g., bent, toward each other at the folding portion 25, such that the first and second exterior materials 21 and 22 completely overlap each other, followed by coupling outermost edges of the materials 21 and 22 to each other. An inner space of the resultant structure, i.e., an inner area of the first and second exterior materials 21 and 22 facing each other with the electrode assembly 10 therebetween, may be formed as the accommodating portion A, and edge areas of the first and second exterior materials 21 and 22 coupled to each other may be formed as the sealing portion TS.

The sealing portion TS may be continuously formed along the edge areas of the first and second exterior materials 21 and 22, and may be continuously formed along the side portions of the first and second exterior materials 21 and 22 except for the folding portion 25. In particular, the sealing portion TS may include a terrace portion T extending in a direction of the front surface F of the accommodating portion A, and a side sealing portion S extending in a direction of the side surface D of the accommodating portion A. At this time, the electrode tab 15 connected to the electrode assembly 10 in the accommodating portion A may be drawn out of the accommodating portion A through the terrace portion T extending in the direction of the front surface F of the accommodating portion A. Also, a protection circuit module 30 may be seated on the terrace portion T, and the electrode tab 15 drawn out through the terrace portion T may be bent to be connected to the protection circuit module 30 seated on the terrace portion T.

The side sealing portion S may include a main body Sb of the side sealing portion S at a position corresponding to the accommodating portion A (e.g., extending lengthwise along the pair of side surfaces D), and a front end portion Sa of the side sealing portion S, which extends from the main body Sb of the side sealing portion S to a position out of the accommodating portion A (e.g., a corner of the sealing portion TS connecting the main body Sb of the side sealing portion S to the terrace portion T). The side sealing portion S may be folded toward the accommodating portion A to reduce the area occupied by the entire battery cell C, and as to be described below, the side sealing portion S may be folded toward the accommodating portion A through primary folding and secondary folding.

For example, in the primary folding, the main body Sb of the side sealing portion S at a position corresponding to the accommodating portion A and the front end portion Sa of the side sealing portion S at a position outside the accommodating portion A may be folded up together. After the primary folding, in the secondary folding, the front end portion Sa of the side sealing portion S at a position outside the accommodating portion A (e.g., without the main body Sb) is folded, so that the front surface F of the accommodating portion A and the terrace portion T are concavely drawn toward a corner where the front surface F and the terrace portion T are in contact with each other. By the primary folding and the secondary folding, the main body Sb of the side sealing portion S may be arranged adjacent to the side surface D of the accommodating portion A, e.g., folded upwardly toward the side surface D of the accommodating portion A, and the front end portion Sa of the side sealing portion S at a position outside the accommodating portion A may form a dog ear concavely drawn toward a corner formed by the front surface F of the accommodating portion A and the terrace portion T, e.g., the front end portion Sa (corner) may be folded inwardly along a diagonal direction.

In general, through the edge of the side sealing portion S, the metal layer 20*a* could be potentially exposed through the cross section where the exterior material 20 forming the side sealing portion S is horizontally cut. However, since the main body Sb of the side sealing portion S is folded toward the side surface D of the accommodating portion A, the edge of the exposed cross-section of the metal layer 20*a* in the main body Sb of the side sealing portion S may be covered and protected, e.g., may not protrude from the side surface D of the accommodating portion A. Similarly, the front end portion Sa of the side sealing portion S is folded to be concavely drawn toward a corner formed by the front surface F of the accommodating portion A and the terrace portion T, and thus, the metal layer 20*a* exposed through the edge of the front end portion Sa of the side sealing portion S may not protrude from the front surface F of the accommodating portion A. Therefore, the main body Sb of the side sealing portion S may be folded onto the side surface D of the accommodating portion A, and the front end portion Sa of the side sealing portion S may not protrude from the side surface of the accommodating portion A and the front surface F of the accommodating portion A, while being folded toward a corner where the terrace portion T and the front surface F of the accommodating portion A are in contact with each other, and may be folded into a shape that follows the outer shape of the accommodating portion A.

In an embodiment, the outer shape of the battery cell C may generally follow the outer shape of the accommodating portion A, and the outer surface of the accommodating portion A, i.e., the front surface F, the rear surface R, the main surfaces M1 and M2, and the side surfaces D of the accommodating portion A, may substantially refer to the outer surface of the battery cell C, i.e., the front surface, the rear surface, the main surfaces, and the side surfaces of the battery cell C, respectively. For example, the battery cell C may further include the sealing portion TS sealing the accommodating portion A in which the electrode assembly 10 is accommodated. In this case, the sealing portion TS, i.e., at least the side sealing portion S thereof, may be folded toward the side surface D and the front surface F of the accommodating portion A to minimize the area occupied by the battery cell C, and thus the outer shape of the battery cell C may generally follow the outer shape of the accommodating portion A. Accordingly, the front surface F, the rear surface R, the main surfaces M1 and M2, and the side surfaces D of the accommodating portion A may substantially refer to the front surface, rear surface, the main surfaces, and the side surfaces of the battery cell C, respectively. For example, the terrace portion T may be formed at a front position of the battery cell C, and because the terrace portion T is formed in a substantial plate (e.g., flat) shape, rather than a plane (e.g., non-flat) shape such that the protection circuit module 30 is seated thereon, the front surface of the battery cell C refers to the front surface F of the accommodating portion A when the outer shape of the battery cell C is approximately rectangular parallelepiped.

As illustrated in FIG. 1, a connector 100 may be arranged on a flexible circuit board 31 of the protection circuit module 30. For example, referring to FIG. 1, the protection circuit module 30 may be seated on the terrace portion T of the battery cell C, and the protection circuit module 30 may extend laterally out of the battery cell C to be connected to the connector 100 via the flexible circuit board 31.

Hereafter, the structure of the connector 100 according to an embodiment is described with reference to FIGS. 3 to 7.

Figure 3:
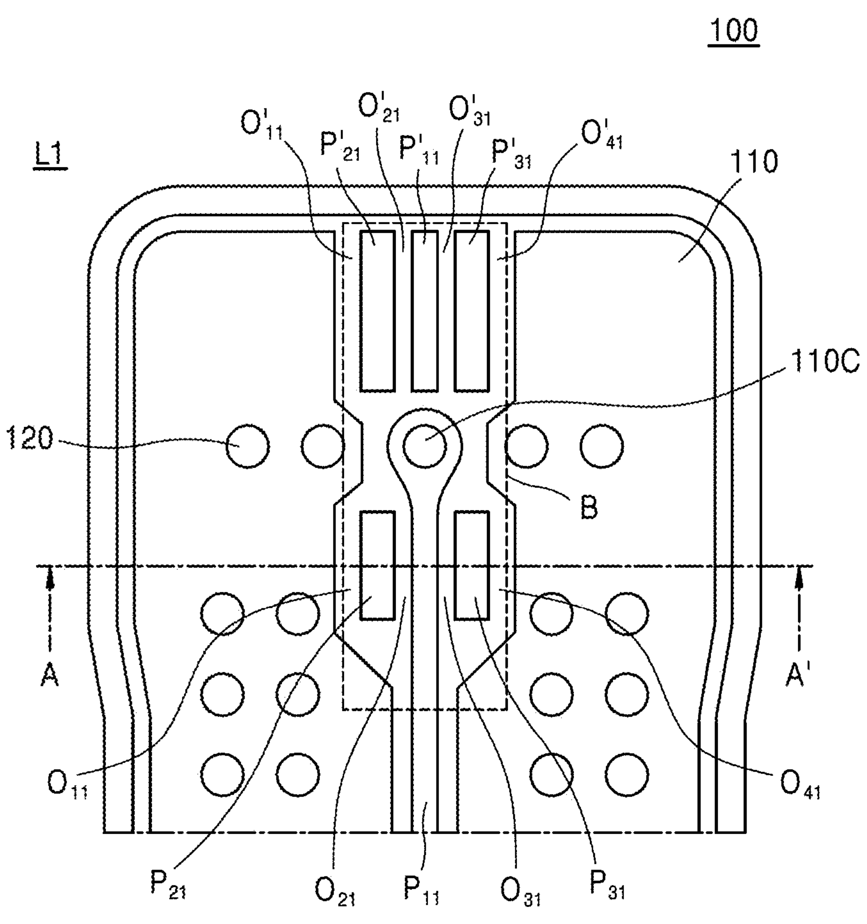
FIG. 3 illustrates a pad arrangement structure in a first layer of a connector of a battery pack according to an embodiment.
Figure 4:
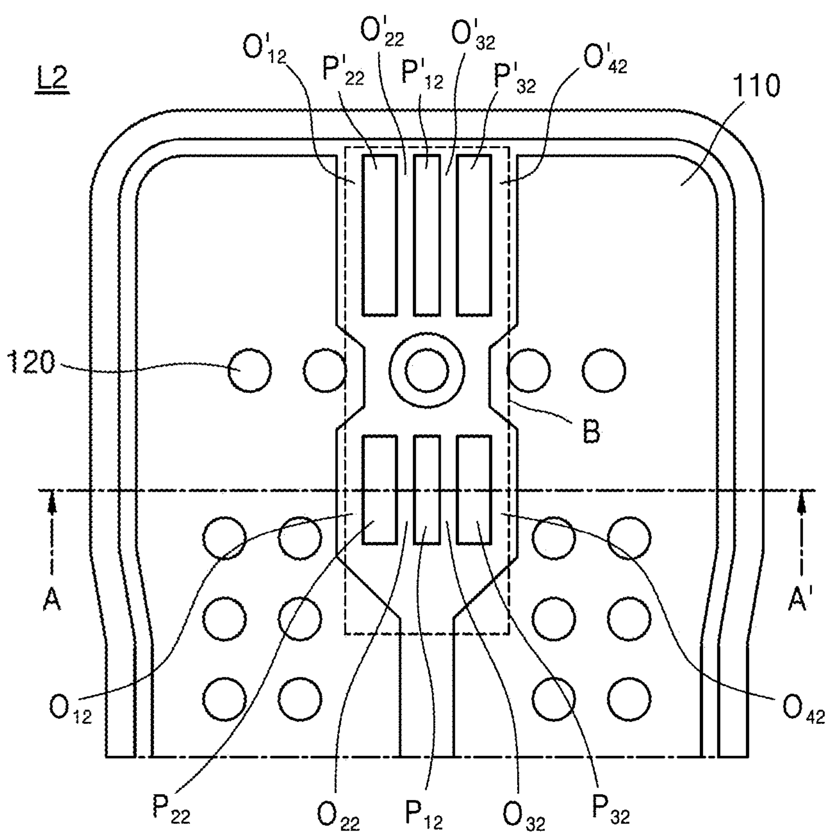
FIG. 4 illustrates a pad arrangement structure in a second layer of a connector of a battery pack according to an embodiment.
Figure 5:
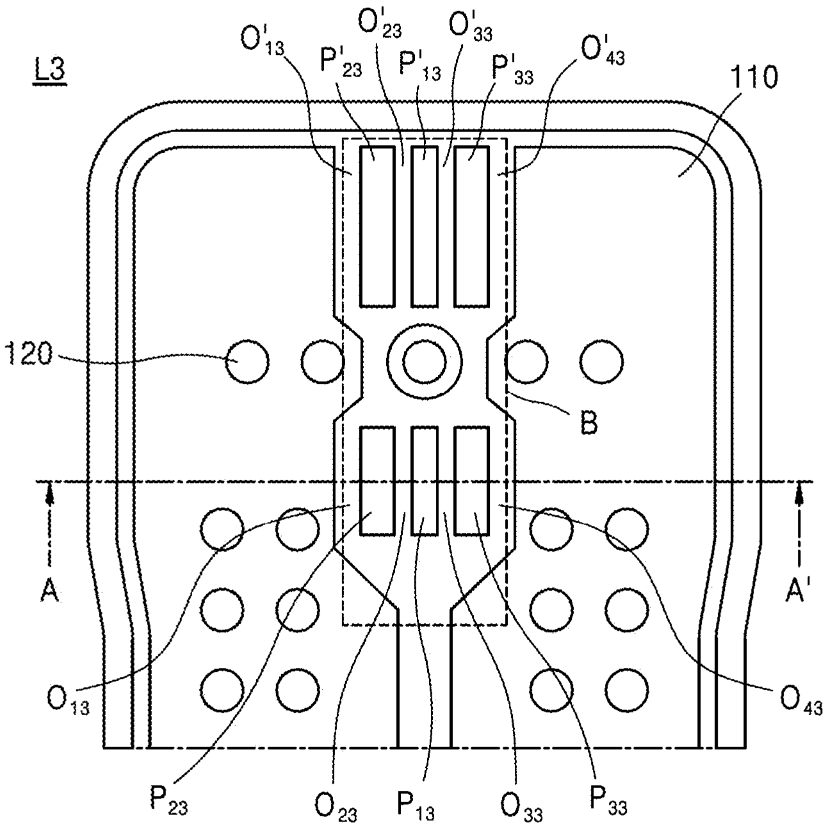
FIG. 5 illustrates a pad arrangement structure in a third layer of a connector of a battery pack according to an embodiment.
Figure 6:
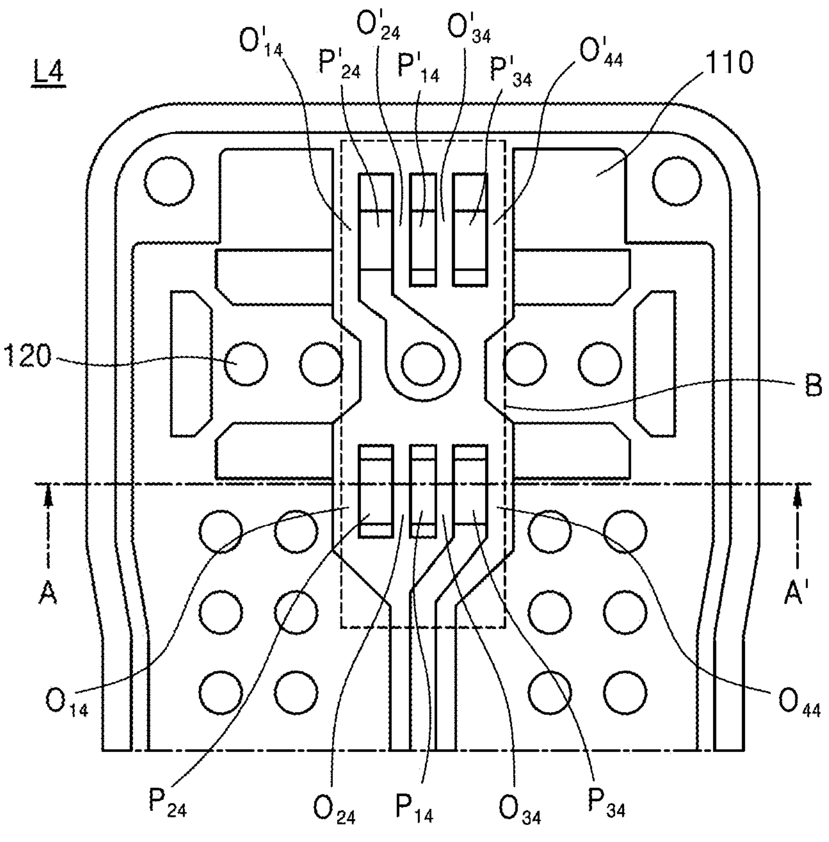
FIG. 6 illustrates a pad arrangement structure in a fourth layer of a connector of a battery pack according to an embodiment.
Figure 7:
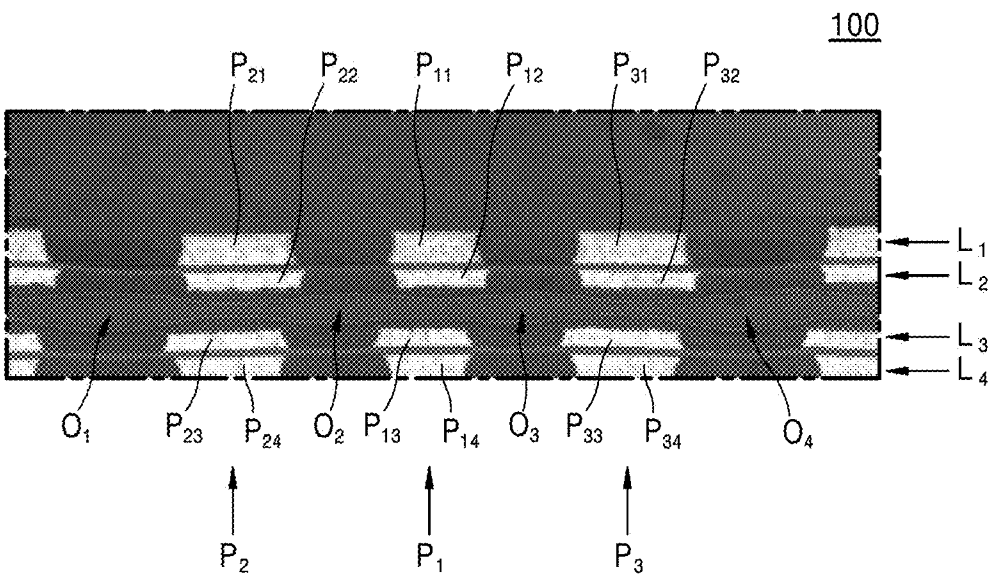
FIG. 7 is a cross-sectional view along lines A-A' of FIGS. 3 to 6.

FIG. 3 shows a pad arrangement structure in a first layer of the connector 100 according to embodiments. FIG. 4 shows a pad arrangement structure in a second layer of the connector 100 according to embodiments. FIG. 5 shows a pad arrangement structure in a third layer of the connector 100 according to embodiments. FIG. 6 shows a pad arrangement structure in a fourth layer of the connector 100 according to embodiments. FIG. 7 is a cross-sectional view along line A-A' of FIGS. 3 to 6 according to embodiments, where the first to fourth layers of FIGS. 3 to 6 are stacked on top of each other.

Referring to FIGS. 3 to 7, the connector 100 according to an embodiment may include a plurality of layers with pads stacked on top of each other. For example, a first layer L1, a second layer L2, a third layer L3, and a fourth layer L4 may be stacked on top of each other, and respective pad portions P may be arranged at corresponding positions in each of the first through fourth layers L1 to L4 at central portions of the respective layers.

For example, as illustrated in FIG. 7, in respective layers of the connector 100, first to third pad portions $P_1$, $P_2$, and $P_3$ may be respectively arranged between first to fourth open portions $O_1$, $O_2$, $O_3$, and $O_4$. That is, in a layered structure of the connector 100, respective pads may be arranged at corresponding positions for respective layers, so a step-difference may be prevented from being formed in a central portion of the connector. In addition, the pad structure of the battery pack connector is stacked and arranged in a vertical direction, and thus rigidity of the battery pack connector may be improved, and tensile strength and shear strength of the battery pack connector may be improved.

In detail, referring to FIGS. 3 to 7, a first open portion $O_1$ includes openings $O_{11}$, $O_{12}$, $O_{13}$, and $O_{14}$, a second open portion $O_2$ includes openings $O_{21}$, $O_{22}$, $O_{23}$, and $O_{24}$, a third open portion $O_3$ includes openings $O_{31}$, $O_{32}$, $O_{33}$, and $O_{34}$, and a fourth open portion $O_4$ includes openings $O_{41}$, $O_{42}$, $O_{43}$, and $O_{44}$. In an embodiment, in respective layers, the first to fourth open portions $O_1$, $O_2$, $O_3$, and $O_4$ may be arranged on opposite, e.g., both, sides of a central terminal portion 110*c*, and the first to third pad portions $P_1$, $P_2$, and $P_3$ may be respectively arranged between the first to fourth open portions $O_1$, $O_2$, $O_3$, and $O_4$. In this way, a plurality of pad portions, which are spaced apart from each other, are respectively arranged on opposite, e.g., both, sides of the central terminal portion 110*c*, so rigidity of the connector 100 may be strengthened on both sides thereof. At this time, the second and third pads $P_2$ and $P_3$ may be arranged to be spaced apart from each other on both sides of the first pad $P_1$, and the second and third pads $P_2$ and $P_3$ may be arranged to be symmetrical to each other around the first pad $P_1$.

In more detail, the first to fourth open portions $O_1$, $O_2$, $O_3$, and $O_4$ may each be arranged on a first side of the central terminal portion 110*c*, and the first to third pad portions $P_1$, $P_2$, and $P_3$ may be respectively arranged between the first to fourth open portions $O_1$, $O_2$, $O_3$, and $O_4$. A fifth open portion $O'_1$ includes openings $O'_{11}$, $O'_{12}$, $O'_{13}$, and $O'_{14}$, a sixth open portion $O'_2$ includes openings $O'_{21}$, $O'_{22}$, $O'_{23}$, and $O'_4$, a seventh open portion O'3 includes openings $O'_{31}$, $O'_{32}$, $O'_{33}$, and $O'_{34}$, and an eighth open portion O'4 includes openings $O'_{41}$, $O'_{42}$, $O'_{43}$, and $O'_{44}$. In addition, the fifth to eighth open portions $O'_1$, $O'_2$, $O'_3$, and $O'_4$ may each be arranged on a second side (opposite the first side) of the central terminal portion 110*c*, and fourth to sixth pad portions $P'_1$, $P'_2$, and $P'_3$ may be respectively arranged between the fifth to eighth open portions $O'_1$, $O'_2$, $O'_3$, and $O'_4$.

Referring to FIG. 3, in the first layer L1, which is the uppermost layer of the battery pack connector according to an embodiment, openings $O_{11}$, $O_{21}$, $O_{31}$, and $O_{41}$ may each be arranged on the first side of the central terminal portion 110*c*, and pad portions $P_{11}$, $P_{21}$, and $P_{31}$ may respectively be arranged between the openings $O_{11}$, $O_{21}$, $O_{31}$, and $O_{41}$. In addition, openings $O'_{11}$, $O'_{21}$, $O'_{31}$, and $O'_{41}$ may each be arranged on the second side of the central terminal portion 110*c*, and pad portions $P'_{11}$, $P'_{21}$, and $P'_{31}$ may be respectively arranged between the openings $O'_{11}$, $O'_{21}$, $O'_{31}$, and $O'_{41}$.

Referring to FIG. 4, in the second layer L2 of the battery pack connector according to an embodiment, openings $O_{12}$, $O_{22}$, $O_{32}$, and $O_{42}$ may each be arranged on the first side of the central terminal portion 110*c*, and pad portions $P_{12}$, $P_{22}$, and $P_{32}$ may respectively be arranged between the openings $O_{12}$, $O_{22}$, $O_{32}$, and $O_{42}$. In addition, openings $O'_{12}$, $O'_{22}$, $O'_{32}$, and $O'_{42}$ may each be arranged on the second side of the central terminal portion 110*c*, and pad portions $P'_{12}$, $P'_{22}$, and $P'_{32}$ may respectively be arranged between openings $O'_{12}$, $O'_{22}$, $O'_{32}$, and $O'_{42}$.

Referring to FIG. 5, in the third layer L3 of the battery pack connector according to an embodiment, openings $O_{13}$, $O_{23}$, $O_{33}$, and $O_{43}$ may each be arranged on the first side of the central terminal portion 110*c*, and pad portions $P_{13}$, $P_{23}$, and $P_{33}$ may respectively be arranged between the openings $O_{13}$, $O_{23}$, $O_{33}$, and $O_{43}$. In addition, openings $O'_{13}$, $O'_{23}$, $O'_{33}$, and $O'_{43}$ may each be arranged on the second side of the central terminal portion 110*c*, and pad portions $P'_{13}$, $P'_{23}$, and $P'_{33}$ may respectively be arranged between the openings $O'_{13}$, $O'_{23}$, $O'_{33}$, and $O'_{43}$.

Referring to FIG. 6, in the fourth layer L4, which is a lowermost layer of the battery pack connector according to an embodiment, openings $O_{14}$, $O_{24}$, $O_{34}$, and $O_{44}$ may each be arranged on the first side of the central terminal portion 110*c*, and pad portions $P_{14}$, $P_{24}$, and $P_{34}$ may respectively be arranged between the openings $O_{14}$, $O_{24}$, $O_{34}$, and $O_{44}$. In addition, openings $O'_{14}$, $O'_4$, $O'_{34}$, and $O'_{44}$ may each be arranged on the second side of the central terminal portion 110*c*, and pad portions $P'_{14}$, $P'_{24}$, and $P'_{34}$ may respectively be arranged between the openings $O'_{14}$, $O'_{24}$, $O'_{34}$, and $O'_{44}$.

Referring to FIG. 7, when the first to fourth layers L1 to L4 are stacked, a state in which the first to third pad portions $P_1$, $P_2$, and $P_3$ are arranged on a layer in corresponding positions between the first to fourth open portions $O_1$, $O_2$, $O_3$, and $O_4$, respectively, may be confirmed. For example, as illustrated in FIG. 7, respective pad portions may be stacked to vertically overlap each other, such that each pad portion is vertically overlapped and supported by a corresponding pad portion. For example, each pad portion is in, e.g., direct, contact with at least one other pad portion in a vertical direction, e.g., along a stacking direction of the first to fourth layers L1 to L4. Accordingly, a phenomenon in which a step-difference is formed on an upper side of a connector (e.g., as a result of a pad of one layer being pressed downwardly into an adjacent layer without being supported by a pad) may be prevented or substantially minimized.

Therefore, according to embodiments, the connector 100 includes a structure in which a plurality of first to third pad portions $P_1$, $P_2$, $P_3$, and fourth to sixth pad portions $P'_1$, $P'_2$, and $P'_3$ are spaced apart from each other, and are arranged on both sides of the central terminal portion 110*c* in a vertically overlapping manner. As such, the overall rigidity of the connector 100 may be improved, and tensile strength and shear strength of the connector 100 may be enhanced. In addition, in the connector 100 according to an embodiment, the possibility of the connector falling off or being damaged during attachment/detachment may be minimized through a pad structure of the battery pack connector.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the inventive concept unless the element is specifically described as "essential" or "critical".

The use of the terms "a" and "an" and "the" and similar referents in the context of describing the disclosure and claims are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein.

Also, the steps of all methods described herein can be performed in any suitable order unless otherwise indicated herein or otherwise clearly contradicted by context.

The disclosure is not limited to the described order of the steps. The use of any and all examples, or exemplary language (e.g., "such as") provided herein, is intended merely to better illuminate the inventive concept and does not pose a limitation on the scope of the inventive concept unless otherwise claimed.

Numerous modifications and adaptations will be readily apparent to one of ordinary skill in the art without departing from the spirit and scope.

According to a battery pack connector according to an embodiment, shear strength and tensile strength of the battery pack connector may be improved.

In addition, in a battery pack connector according to an embodiment, the possibility of the connector falling off or being damaged during attachment/detachment may be minimized through a pad structure of the battery pack connector.

The effects of the disclosure are not limited to the effects mentioned above, and other effects not mentioned will be clearly understood by those skilled in the art from the description of the claims.

By way of summation and review, a connector may include a plurality of stacked layers with pads in each of the layers. However, when a pad arrangement structure includes a pad overlapping an open portion of an adjacent layer, e.g., a portion of an underlying layer without pads or other elements therein, an external impact or pressure applied to the connector may press the pad into the open area, thereby causing a step-difference between the stacked layers, e.g., between a portion in which the pad is arranged in the central portion and a metal unit. As such, the central portion of the connector may be depressed, thereby reducing rigidity of the connector. In contrast, one or more embodiments include a battery pack connector in which separation and damage of the connector are prevented by improving rigidity of the connector via pad arrangement.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack connector, comprising:

a plurality of layers stacked on top of each other along a vertical direction; and a plurality of pad portions in each of the plurality of layers, the plurality of pad portions in each of the plurality of layers being separated and spaced apart from each other, and the plurality of pad portions in each of the plurality of layers being arranged in a central portion of each of the plurality of layers and overlapping pad portions in adjacent ones of the plurality of layers.

2. The battery pack connector of claim 1, wherein the plurality of pad portions include first, second, and third pad portions, the first, second, and third pad portions being arranged to define first and second open portions therebetween, respectively, in each of the plurality of layers.

3. The battery pack connector of claim 2, further comprising a central terminal portion in the central portion of each of the plurality of layers, the first, second, and third pad portions being arranged on each of opposite sides of the central terminal portion in each of the plurality of layers.

4. The battery pack connector of claim 2, wherein the second and third pad portions are respectively arranged on opposite sides of the first pad portion to be spaced apart from each other.

5. The battery pack connector of claim 4, wherein the second and third pad portions are symmetrically arranged with respect to the first pad portion.

6. The battery pack connector of claim 1, wherein each of the plurality of pad portions overlaps at least another of the plurality of pad portions in an adjacent one of the plurality of layers along the vertical direction.

7. The battery pack connector of claim 1, wherein the plurality of pad portions are arranged in pairs in the vertical direction, each of the pairs being positioned in adjacent ones of the plurality of layers, respectively, and each of the pairs vertically overlapping each other.

8. A battery pack comprising the battery pack connector of claim 1.

9. A battery pack connector, comprising:

a plurality of layers stacked on top of each other along a vertical direction; and a plurality of pad portions in each of the plurality of layers, the plurality of pad portions in each of the plurality of layers being separated and spaced apart from each other, and each of the plurality of pad portions overlapping at least another of the plurality of pad portions in an adjacent one of the plurality of layers along the vertical direction.

10. The battery pack connector of claim 1, wherein all the plurality of pad portions in each of the plurality of layers vertically overlap all the plurality of pad portions in the adjacent one of the plurality of layers, respectively.

11. The battery pack connector of claim 10, wherein open portions between all the plurality of pad portions in each of the plurality of layers vertically overlap all the open portions between all the plurality of pad portions in the adjacent one of the plurality of layers, respectively.

12. The battery pack connector of claim 1, wherein each of the plurality of layers is in direct contact with an adjacent one of the plurality of layer in the vertical direction.

13. A battery pack, comprising:

a battery cell;

a protection circuit module electrically connected to the battery cell, the protection circuit module including an edge extending laterally out of the battery cell; and a battery pack connector connected to the edge of the protection circuit module via a flexible circuit board, the battery pack connector including:

a plurality of layers stacked on top of each other along a vertical direction; and a plurality of pad portions in each of the plurality of layers, the plurality of pad portions in each of the plurality of layers being separated and spaced apart from each other, and the plurality of pad portions in each of the plurality of layers being arranged in a central portion of each of the plurality of layers and overlapping pad portions in adjacent ones of the plurality of layers.

14. The battery pack of claim 13, wherein the battery pack connector and the battery cell have a non-overlapping relationship.

* * * * *